US011852553B2

(12) United States Patent
Garbuzov (10) Patent No.: US 11,852,553 B2
(45) Date of Patent: Dec. 26, 2023

(54) SYSTEM FOR REMOTELY MEASURING PRESSURE USING RFID TAGS AND METHODS OF USE THEREOF (71) Applicant: Yuri P. Garbuzov, Newport Coast, CA (US)

(72) Inventor: Yuri P. Garbuzov, Newport Coast, CA (US)

(73) Assignee: Yuri P. Garbuzov, Newport Coast, CA (US)

( * ) Notice: Subject to any disclaimer, the term of this patent is extended or adjusted under 35 U.S.C. 154(b) by 608 days.

(21) Appl. No.: 17/070,352

(22) Filed: Oct. 14, 2020

(65) Prior Publication Data

US 2021/0108983 A1 Apr. 15, 2021

Related U.S. Application Data (60) Provisional application No. 62/914,979, filed on Oct. 14, 2019.

(51) Int. Cl.
*G01L 7/04* (2006.01)
*G01L 19/08* (2006.01)
(Continued)

(52) U.S. Cl.
CPC ............. *G01L 19/086* (2013.01); *G01L 7/04* (2013.01); *G01L 7/08* (2013.01); *G01L 17/00* (2013.01);
(Continued)

(58) Field of Classification Search
CPC ......... G01L 19/086; G01L 19/08; G01L 7/04; G01L 7/08; G01L 17/00; G01L 19/149;
(Continued)

(56) References Cited

U.S. PATENT DOCUMENTS

| 7,460,014 | B2 | 12/2008 | Pettus | |
| 2006/0025897 | A1* | 2/2006 | Shostak | G08G 1/017 701/1 |
| 2018/0348075 | A1* | 12/2018 | Rubinstein | G01L 19/00 |

FOREIGN PATENT DOCUMENTS

| JP | 2005134125 A | 11/2006 | |
| KR | 20070053473 A * | 5/2007 | B60C 23/04 |

* cited by examiner

*Primary Examiner* — Tarun Sinha
*Assistant Examiner* — James I Burris
(74) *Attorney, Agent, or Firm* — Troutman Pepper Hamilton Sanders LLP (Rochester)

(57) ABSTRACT

A method for remotely measuring pressure of a fluid in a container includes determining a spatial location of first and second resonant radiofrequency antenna elements located on a radiofrequency identification (RFID) tag located in the container. The first antenna element is positioned in a fixed position on the RFID tag and the second antenna element is positioned on a deformable element configured to be deformed in at least one dimension based on pressure from the fluid. The spatial location is determined from a radar image generated based on reflected radiofrequency beams from a scan area and re-radiated radiofrequency beams from the first and second antenna elements located within the scan area. A pressure value is determined for the fluid based on the spatial location of the first and second antenna elements. Systems and methods of remotely measuring pressure using passive RFID tags are also disclosed.

21 Claims, 5 Drawing Sheets (51) Int. Cl.
*G01L 7/08* (2006.01)
*G06K 19/077* (2006.01)
*G01L 17/00* (2006.01)
*G06K 19/07* (2006.01)
*G01L 19/14* (2006.01)

(52) U.S. Cl.
CPC ........ *G01L 19/149* (2013.01); *G06K 19/0717* (2013.01); *G06K 19/07764* (2013.01); *G06K 19/07794* (2013.01)

(58) Field of Classification Search
CPC ..... G01L 19/14; G01L 11/00; G06K 19/0717; G06K 19/07; G06K 19/07764; G06K 19/077; G06K 19/07794; B60C 23/0428; B60C 23/0491; B60C 23/04
See application file for complete search history.

SYSTEM FOR REMOTELY MEASURING PRESSURE USING RFID TAGS AND METHODS OF USE THEREOF

This application claims the benefit of U.S. Provisional Patent Application No. 62/914,979 filed Oct. 14, 2019 the entirety of which is incorporated herein by reference.

FIELD

The present technology relates to a system for remotely measuring pressure using radiofrequency identification (RFID) tags and methods of use thereof. More specifically, the present technology relates to systems and methods for remotely measuring pressure using entirely passive RFID tags.

BACKGROUND

Standard techniques for measuring gas or liquid pressure within deformable containers requires gauges or manometers. These techniques require either external direct access to a container, such as a tire, with a gas or a liquid, or placing a pressure sensitive element inside the container. Locating the pressure sensitive element inside the container requires that the pressure sensitive element can communicate with an external communication reader.

While the majority of current pressure measuring methods rely on either active (with batteries and transmitters) sensors placed inside tires or gauges with transmitters incorporated in the tire valves, passive pressure sensors have been employed where an external interrogator device was used to read either changing electrostatic capacity between electrodes or voltage of a piezoelectric element incorporated into the construction of the tag. Though these passive tags did not require batteries, they contained multiple parts and some versions were mechanically complicated and not small or light, which makes them high cost and subject to failure, which is undesirable.

SUMMARY

A method for remotely measuring pressure of a fluid in a container, implemented by one or more computing devices, includes determining a spatial location of first and second resonant radiofrequency antenna elements located on a radiofrequency identification (RFID) tag located in the container holding the fluid such that the RFID tag is immersed in the fluid. The first radiofrequency antenna element is positioned in a fixed position on the RFID tag and the second resonant radiofrequency antenna element is positioned on a deformable element configured to be deformed in at least one dimension based on pressure from the fluid. The spatial location is determined from a radar image generated based on reflected radiofrequency beams from a scan area and re-radiated radiofrequency beams from the first and second resonant radiofrequency antenna elements located within the scan area resulting from the transmission of a radiofrequency beam to the scan area. A pressure value is determined for the fluid based on the spatial location of the first and second resonant radiofrequency antenna elements.

An RFID interrogator device, comprising memory comprising programmed instructions stored thereon and one or more processors configured to execute the stored programmed instructions to determine a spatial location of first and second resonant radiofrequency antenna elements located on a radiofrequency identification (RFID) tag located in the container holding the fluid such that the RFID tag is immersed in the fluid. The first radiofrequency antenna element is positioned in a fixed position on the RFID tag and the second resonant radiofrequency antenna element is positioned on a deformable element configured to be deformed in at least one dimension based on pressure from the fluid. The spatial location is determined from a radar image generated based on reflected radiofrequency beams from a scan area and re-radiated radiofrequency beams from the first and second resonant radiofrequency antenna elements located within the scan area resulting from the transmission of a radiofrequency beam to the scan area. A pressure value is determined for the fluid based on the spatial location of the first and second resonant radiofrequency antenna elements.

A non-transitory computer readable medium having stored thereon instructions for remotely measuring pressure of a fluid in a container comprising executable code that, when executed by one or more processors, causes the processors to determine a spatial location of first and second resonant radiofrequency antenna elements located on a radiofrequency identification (RFID) tag located in the container holding the fluid such that the RFID tag is immersed in the fluid. The first radiofrequency antenna element is positioned in a fixed position on the RFID tag and the second resonant radiofrequency antenna element is positioned on a deformable element configured to be deformed in at least one dimension based on pressure from the fluid. The spatial location is determined from a radar image generated based on reflected radiofrequency beams from a scan area and re-radiated radiofrequency beams from the first and second resonant radiofrequency antenna elements located within the scan area resulting from the transmission of a radiofrequency beam to the scan area. A pressure value is determined for the fluid based on the spatial location of the first and second resonant radiofrequency antenna elements.

A system for remotely measuring pressure of a fluid in a container includes a radiofrequency identification (RFID) tag configured to be located in the container such that the RFID tag is immersed in the fluid. The RFID tag includes a deformable element, configured to be deformed in at least one dimension based on pressure from the fluid, located thereon. A first resonant radiofrequency antenna element is positioned in a fixed position on the RFID tag. A second resonant radiofrequency antenna element is positioned on the deformable element. The system also includes an interrogator device configured to transmit a radiofrequency beam to a scan area and a computing device comprising memory comprising programmed instructions stored thereon and one or more processors configured to execute the stored programmed instructions to determine a spatial location of the first and second resonant radiofrequency antenna elements from a radar image generated based on reflected radiofrequency beams from the scan area and re-radiated radiofrequency beams from the first and second resonant radiofrequency antenna elements located within the scan area resulting from the transmission of the radiofrequency beam to the scan area. A pressure value for the fluid is determined based on the spatial location of the first and second resonant radiofrequency antenna elements.

A method for remotely measuring pressure of a fluid in a container includes providing a radiofrequency identification (RFID) tag located in the container such that the RFID tag is immersed in the fluid. The RFID tag includes a deformable element, configured to be deformed in at least one dimension based on pressure from the gas or liquid, located thereon. A first resonant radiofrequency antenna element is positioned in a fixed position on the RFID tag. A second resonant radiofrequency antenna element is positioned on the deformable element. The RFID tag is scanned using an interrogator device configured to transmit a radiofrequency beam to a scan area. A spatial location of the first and second resonant radiofrequency antenna elements is determined from a radar image generated based on reflected radiofrequency beams from the scan area and re-radiated radiofrequency beams from the first and second resonant radiofrequency antenna elements located within the scan area resulting from the transmission of the radiofrequency beam to the scan area. A pressure value for the fluid is determine based on the spatial location of the first and second resonant radiofrequency antenna elements.

The present technology provides a number of advantages including providing systems and methods of the remote measurement of pressure in a container using RFID that employs low-cost, low-weight, passive RFID tags.

DETAILED DESCRIPTION

Figure 1:
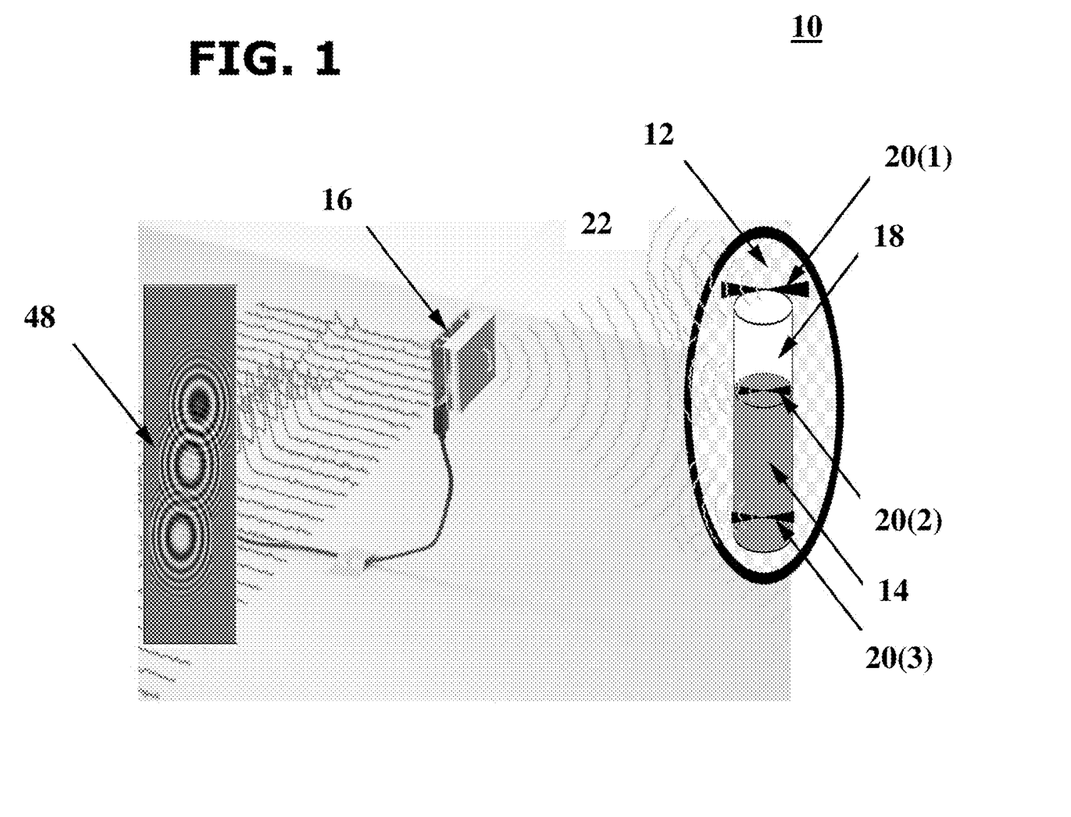
FIG. 1 is an environment including an exemplary radiofrequency identification (RFID) pressure measurement system of the present technology including an RFID interrogator device and a schematic view of a RFID tag to be utilized with the RFID interrogator device.

An example of a RFID pressure measurement system 10 is illustrated in FIG. 1. In this particular example, the RFID pressure measurement system 10 includes a RFID tag 12 having a pressure sensitive deformable element 14 and a RFID interrogator device 16 configured to allow for radar imaging of the RFID tag 12 to measure pressure in the vicinity of the RFID tag, although the RFID pressure measurement system 10 may include other types and/or number of other systems, devices, components, and or other elements in other combinations, including additional RFID interrogator devices and any number of RFID tags, by way of example only. The RFID pressure measurement system 10 advantageously allows for remotely measuring pressure using radar imaging. The RFID pressure measurement system 10 can be employed with RFID tag 12, which that is an entirely passive RFID tag. The RFID tag 12 provides a robust tag that may be located in areas where pressure measurements are desirable, such as inside tires by way of example. By way of example, the RFID pressure measurement system 10 advantageously employs very light, durable tags with very few or no mechanical parts that would require maintenance.

For example, the systems and methods disclosed herein may be employed for measuring the pressure within car or bicycle tires. The present technology allows for live pressure monitoring with a light, simple, and reliable pressure sensor, which can be placed once inside a tire and will never require service or a battery change is very attractive. The system employs passive tags that allow for sensing the pressure with all reading and data processing done externally without any need for direct access to the sensor. By way of example, car or bicycle tires do not require high precision across a wide range of potential pressure values. In fact, they tend to operate in specific relatively narrow ranges: 15-40 psi for mountain bikes, 50-120 psi for road bikes, 15-45 psi for car tires, 70-120 psi for trucks—only a factor of 3 or less from the bottom to the top of each range. The present technology can be used to determine if the pressure is drifting away from a target and particularly if it moves outside of the specified ranges as soon as it happens.

Referring again to FIG. 1, in this example the RFID tag 12 includes the pressure sensitive deformable element 14, an enclosure 18, and resonant radiofrequency antenna elements 20(1)-20(3), although RFID tag 12 could include other types and/or number of elements in other configurations, such as additional resonant radiofrequency elements, by way of example. It is to be understood that although resonant radiofrequency antenna elements 20(1)-20(3) are illustrated and described, in other examples any number of resonant radiofrequency antenna elements may be employed on the RFID tag 12. In one example, the RFID tag may include only resonant radiofrequency antenna elements 20(1) and 20(2) and resonant radiofrequency antenna element may be omitted. In this example, the RFID tag 12 includes only passive elements such that RFID tag does not include any mechanical parts. The RFID tag 12 is constructed from light-weight materials. In one example, the RFID tag 12 has a weight of less than 5 grams. The very low weight of the RFID tag 12 allows for a low sensitivity to centrifugal forces, such as those on the inside a moving tire (equivalent to less than 1 psi). The RFID tag 12 is configured to be located inside any container with a fluid, i.e., gas or liquid, for which pressure measurements are desired. For example, the RFID tag 12 may be located inside a tire to allow for remote measurement of the air pressure in the tire. The RFID tag 12 could be employed with regular or tubeless tires. In another example, the RFID tag 12 may be employed in sports equipment, such as footballs, basketballs, volleyballs, or tennis balls, to measure the air pressure inside. Although exemplary uses are described, it is to be understood that the RFID tag 12 of the present technology can be employed in any container that includes a fluid under pressure for which pressure measurements are desirable. In one example, the RFID tag 12 is constructed of materials that are resistant to aggressive gases and liquids.

The RFID tag 12 includes the deformable element 14 located thereon. The deformable element 14 is configured to deform in at least one dimension in response to pressure from the environment proximate to the deformable element 14. Thus, the configuration of the deformable element 14 is variable with pressure in at least one dimension. In one example, deformable element 14 can be constructed of an elastic material, although in other examples, the deformable element can be based on a bourdon tube or incorporate membranes or coils, although other mechanisms can be employed for the deformable element 14 that allow the configuration of the deformable element 14 to vary in at least one dimension based on pressure applied to the deformable element 14 by a fluid.

In one example, the deformable element 14 is located in the rigid enclosure 18. In this example, rigid means that the configuration of the enclosure 18 does not vary in response to the pressure in the environment in which the RFID tag 12 is located. The enclosure 18 is fixedly attached to the RFID tag 12. In this example, the enclosure 18 protects the deformable element 14 and also serves to restrict deformation of the deformable element 14 in one dimension (based on the pressure in the environment of the RFID tag). The enclosure 18 includes an opening 22 that allows for fluid in the container in which the RFID tag 12 is located to contact the deformable element 14. Although the enclosure 18 is illustrated and described, it is not required for operation of the RFID tag 12 and is optional.

In this example, the RFID tag 12 includes the resonant radiofrequency antenna elements 20(1)-20(3), although other numbers of resonant radiofrequency antenna elements may be employed. The resonant radiofrequency antenna elements 20(1)-20(3) are configured to re-radiate radiofrequency signals received from the RFID interrogator device 16, for example, back to the RFID interrogator device 16 to form a radar image. In one example, the RFID tag 12 may use parametric reflective technology that may be utilized for SAR as disclosed by way of example in U.S. Pat. No. 7,460,014, the disclosure of which are incorporated herein by reference in their entirety, although other resonant radiofrequency antenna elements may be employed. The resonant radiofrequency antenna elements 20(1)-20(3) can have different resonant frequencies, polarization or phase parameters to make them distinguishable from one another when performing radar imaging of the RFID tag 12. In this example, the resonant radiofrequency antenna elements 20(1) and 20(3) are positioned on fixed positions on the RFID tag 12, while the resonant radiofrequency antenna element 20(2) is coupled to the deformable element 14. In this manner, the resonant radiofrequency 20(2) moves or slides along with the deformable element 14 as the deformable element 14 varies in at least one dimension, while the resonant radiofrequency antenna elements 20(1) and 20(3) remain in fixed positions on the RFID tag 12. The resonant radiofrequency antenna elements 20(1) and 20(3) serve as a frame of reference for the movement of the resonant radiofrequency antennal element 20(2), which is directly related to changes in the deformable element 14 due to pressure. In another example, only the resonant radiofrequency antenna element 20(1) is employed to provide a frame of reference. In yet another example, a plurality of resonant radiofrequency antenna elements are employed to provide a more detailed frame of reference for the movement of the resonant radiofrequency antenna element 20(2). A plurality of additional intermediate resonant radiofrequency antenna elements aligned with the displacement of the movable resonant radiofrequency antenna element 20(2) allows for more accurate location in the radar image and for correction of any curvature of the rigid enclosure 18, such as may occur in a tire.

Figure 2:
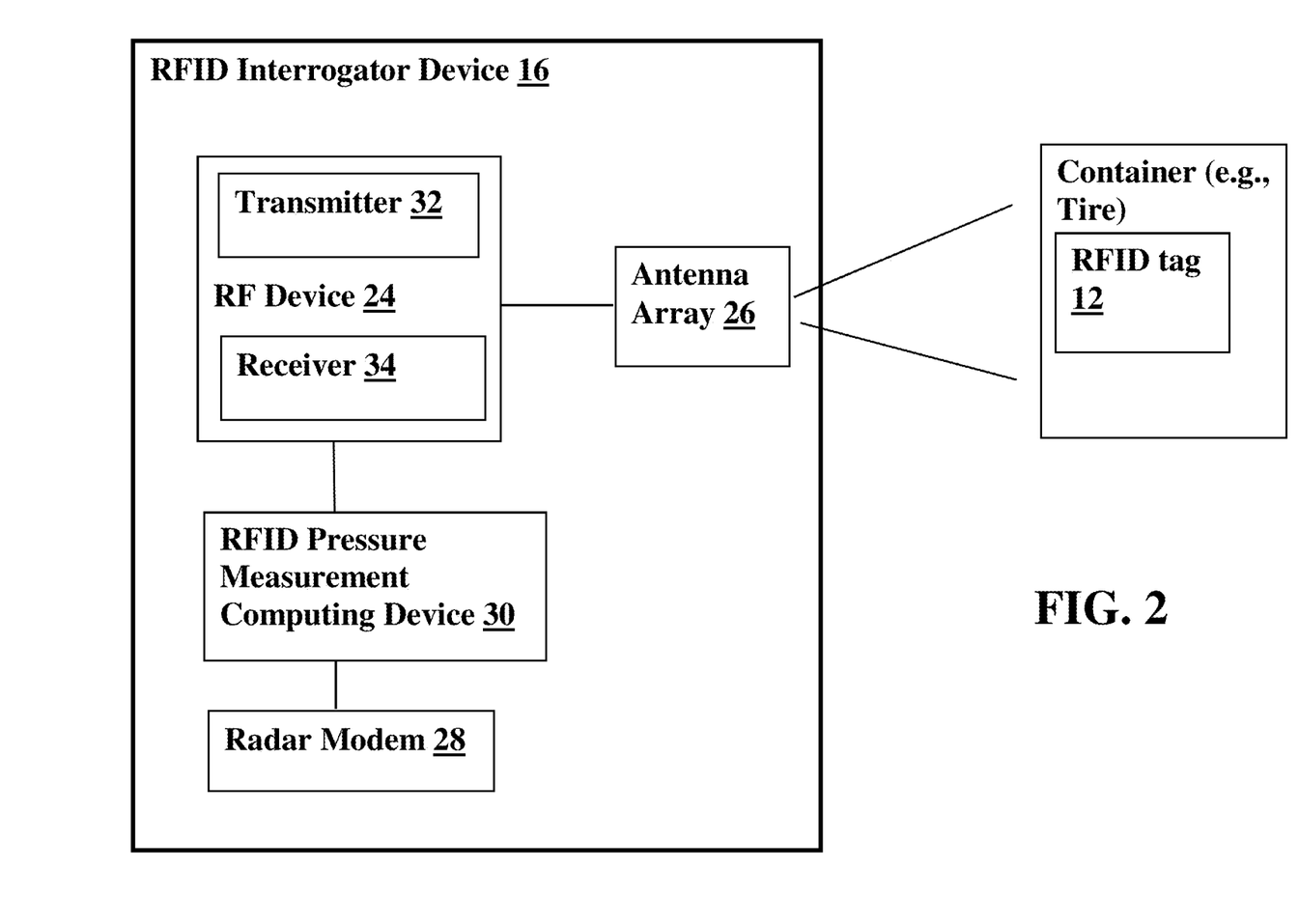
FIG. 2 is a block diagram of the RFID interrogator device of FIG. 1.

Referring now to FIGS. 1 and 2, in this example, the RFID interrogator device 16 includes a radiofrequency device 24, an antenna array 26, a radar modem 28, and a RFID pressure measurement computing device 30, although the RFID interrogator device 16 may include other types and/or numbers of components and or other elements in other combinations, including additional electronics. In another example, the RFID interrogator device 16 and the RFID pressure measurement computing device 30 may be separate elements coupled by one or more communication networks. The RFID interrogator device 16 advantageously allows for radar imaging of a scan area that may include RFID tag 12, although the scan area may include a plurality of RFID tags of the present technology. The RFID interrogator device 16 also processes to the obtained radar images to determine pressure measurements in the environment of the RFID tag 12 in accordance with the exemplary methods described herein.

The radiofrequency device 24 includes a transmitter 32 and receiver 34 located on a chip for transmitting and receiving radiofrequency waves through the antenna array 26, respectively, although the radiofrequency device 24 may include other types and/or numbers of elements, such as a digital signal processor, by way of example only. In one example, the radiofrequency device 24 is a synthetic aperture radar (SAR) device such as described in U.S. Pat. No. 7,460,014, the disclosure of which is incorporated herein by reference in its entirety. By way of example, the radiofrequency device 24 may employ SAR techniques to locate and to create images of tags made of a plurality of resonant RF antennas, as described below, for identifying locations, orientations and phase shifts of the antenna elements on the tag, although other radar devices that employ other radar techniques may also be employed.

The antenna array 26 is coupled to the radiofrequency device 24 to transmit and receive millimeter wave radiofrequency. In one example, the antenna ray 22 is configured to provide a wide beam pattern that can be utilized for high resolution SAR imaging for locating, imaging, and decoding chip-less RFID tags as disclosed in U.S. Pat. No. 7,460,014, the disclosure of which is incorporated herein by reference in its entirety. The antenna array 26 is utilized for three-dimensional radar imaging of a scan area to provide a radar image of RFID tags, such as RFID tag 14, which is described below, in a scan area defined by the field of the antenna array 26.

The radiofrequency device 24 is coupled to the radar modem 28, which allows the RFID interrogator device 16 to perform radar imaging, as described in further detail below. In one example, the radar modem 28 is a frequency modulated continuous wave (FMCW) radar modem, although other suitable radar modems may be employed for the RFID interrogator device 16.

Figure 3:
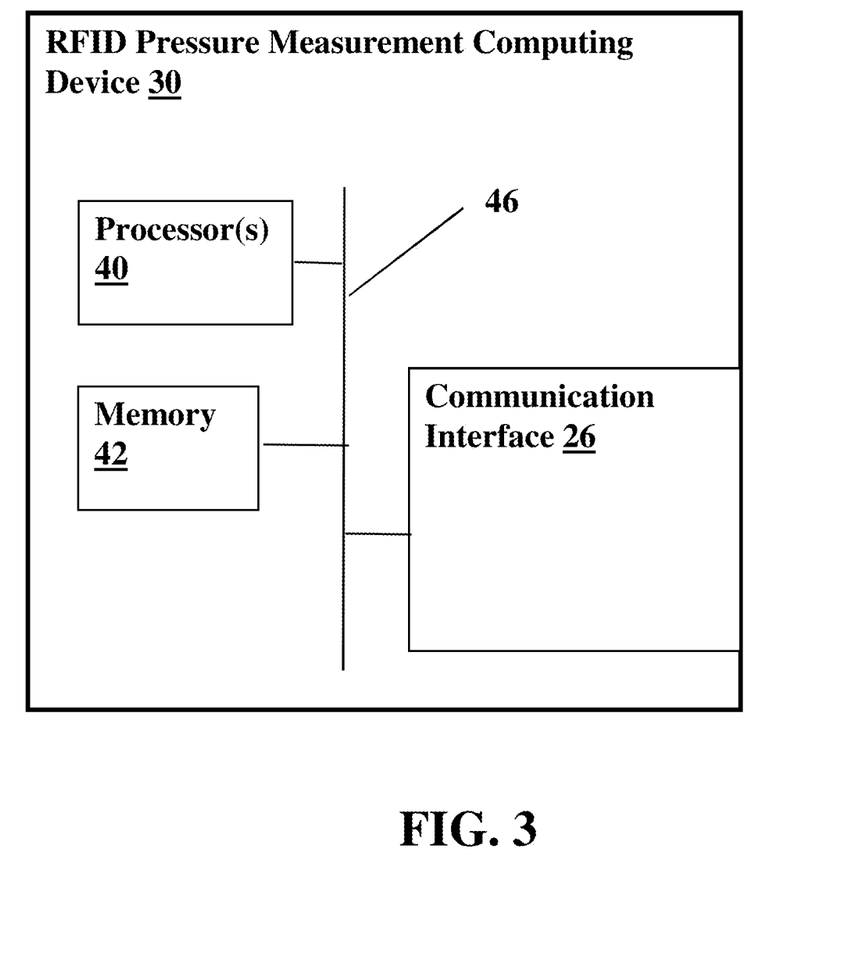
FIG. 3 is a block diagram of an exemplary pressure measurement computing device for the RFID interrogator device.
Figure 4:
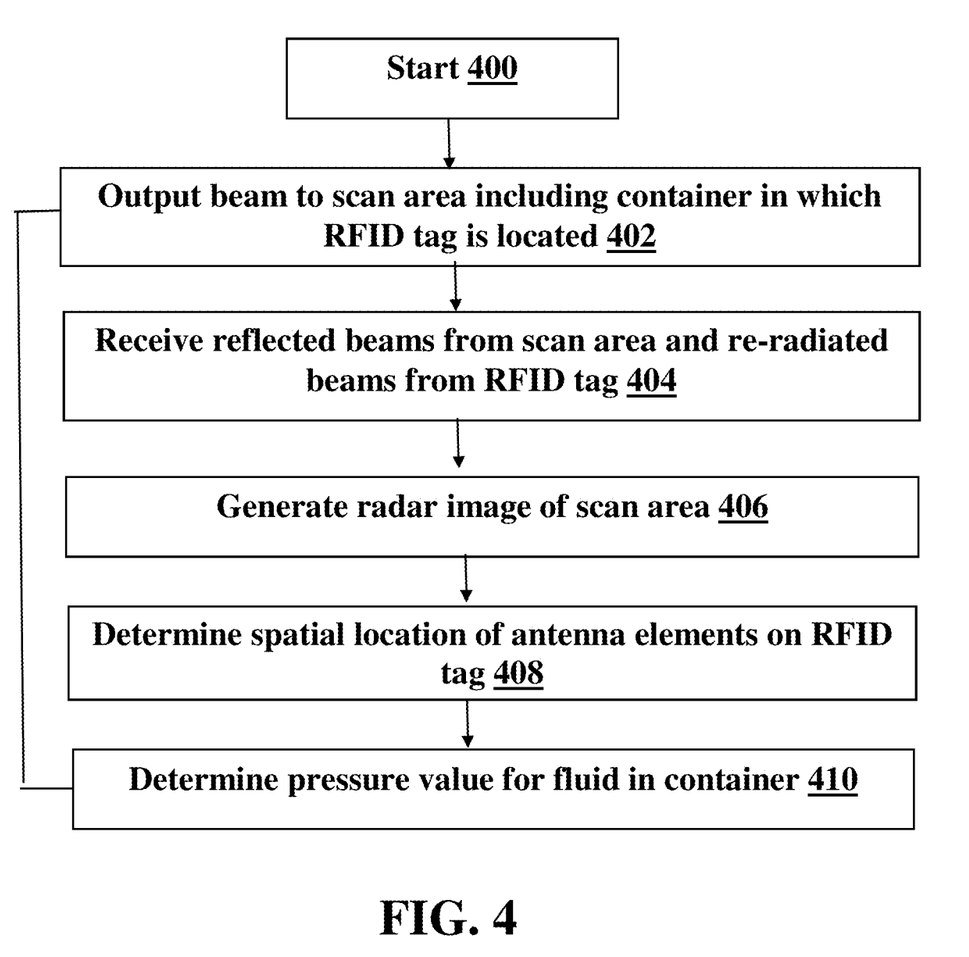
FIG. 4 is an illustration of exemplary radar image data obtained using the RFID pressure measurement system.

Referring now more specifically to FIGS. 2 and 3, the RFID pressure measurement computing device 30 in this example includes one or more processor(s) 40, a memory 42, and/or a communication interface 44, which are coupled together by a bus 46 or other communication link, although the RFID pressure measurement computing device 30 can include other types and/or numbers of elements in other configurations. In one example, the RFID pressure measurement computing device 30 is a microcontroller located on the same chip as the radiofrequency device 24 of the RFID interrogator device 16. In other examples, the RFID pressure measurement computing device 30 is a separate device from the RFID interrogator device 16 and the two elements are coupled by a communication network.

The processor(s) 40 of the pressure measurement computing device 30 may execute programmed instructions stored in the memory 42 for the any number of the functions described and illustrated herein. In one example, the processor(s) 40 provides instructions to the radiofrequency device 24 of the RFID interrogator device 16. In another example, the processor(s) 40 receive radar image data from the radiofrequency device 24 and process the radar image data to identify and locate the spatial location of resonant radiofrequency antenna elements 20(1)-20(3) on the RFID tag 12, for example, in the field of the antenna array 26. The processor(s) 40 are configured to determine pressure values for the environment surrounding the RFID tag 12 based on the spatial location of resonant radiofrequency antenna elements 20(1)-20(3) in the obtained radar image, as described below. The processor(s) may 40 include one or more CPUs, GPUs, or general purpose processors with one or more processing cores, for example, although other types of processor(s) can also be used such as FPGA devices.

The memory 42 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory 42 of the RFID pressure measurement computing device 30 can store one or more applications or programs that can include computer executable instructions that, when executed by the processor (s) 40 of the RFID pressure measurement computing device 30, cause the RFID pressure measurement computing device 30 to perform actions described below. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the image acquisition computing device. The communication interface 44 operatively couples and communicates between the RFID pressure measurement computing device 30 and the radiofrequency device 24, and the radar modem 28.

In another example, the RFID pressure measurement computing device 30 is a highly integrated microcontroller device with a variety of on-board hardware functions, such as analog to digital converters, digital to analog converters, serial buses, general purpose I/O pins, RAM, and ROM. The microcontroller may be located on the same chip as the radiofrequency device 24 of the RFID interrogator device 16, by way of example.

Although the exemplary RFID pressure measurement computing device 30 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the RFID pressure measurement computing device 30. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary operation of the (RFID) pressure measurement system 10 of the present technology will now be described with reference to FIGS. 1-5. The exemplary operation starts in step 400.

Figure 5:
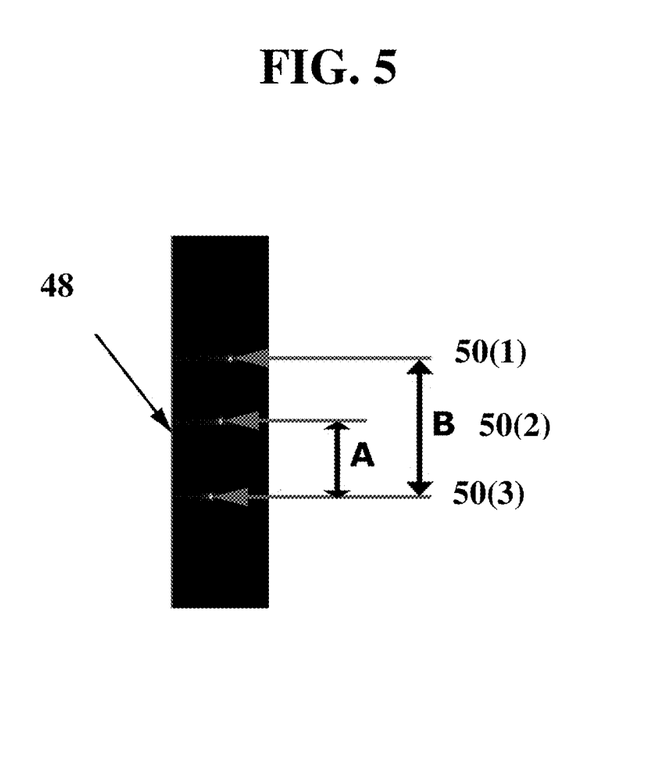
FIG. 5 is a flowchart of an exemplary operation of the RFID pressure measurement system of FIG. 1.

First, in step 402 the RFID interrogator device 16 outputs a beam that transmits electromagnetic radiation through the antenna array 26 to a large scan area that includes the RFID tag 12 using the radar modem 28, which is coupled to the radiofrequency device 24. The RFID interrogator device 16 may have any operational frequency known in the art. In this example, the operational range of the system extends from a few centimeters up to several meters. By way of example, only, the RFID interrogator device 16 may be employed to scan a tire that includes the RFID tag located therein. In one example, SAR radar is employed. In this example, the RFID interrogator device 16 can be moved over the RFID tag 12, or alternatively, the tire is rotated through a scan area covered by the RFID interrogator device 16. The electromagnetic radiation transmitted from the antenna array 26 is received at the RFID tag 12 in the scanned area, causing the resonant radiofrequency antenna elements 20(1)-20(3) of the RFID tag 12 to resonate at the desired frequency and re-radiate the electromagnetic signals back toward the RFID interrogator device 16. Although a single RFID interrogator device 16 is described in the exemplary method, it is to be understood that multiple RFID interrogator devices can be employed to scan the RFID tag 12. In one example, multiple scans may be obtained over a period of time.

In step 404, the RFID interrogator device 16 receives reflected radiofrequency beams from the scan area and re-radiated radiofrequency beams from the RFID tag 12 located within the scan area resulting from the transmission of the first radiofrequency beam to the scan area in step 402. Step 404 may be repeated for a plurality of scans over a period of time.

In step 406, the RFID control computing device 30 of the RFID interrogator device 16 generates a radar image of the scanned area using the received reflected radiofrequency beams from the scan area and re-radiated radiofrequency beams from the resonant radiofrequency antenna elements 20(1)-20(3) of the RFID tag 12 located within the scan area. The RFID interrogator device 16 samples and stores the received signals from the reflected electromagnetic radiation from the RFID tag located in the scan area in the memory 42 of the RFID control computing device 30. The RFID control computing device 30 processes the phase history and polarization samples obtained using general signal processing algorithms as are known in the art, such as mathematical coherent phase analysis, although other processing algorithms are contemplated. The RFID computing device 30 is then able to generate a radar images of the scanned area from the phase history samples and associated polarization data. In one example, the RFID computing device 30 generates a plurality of radar images over a period of time.

In step 408, the RFID control computing device 30 of the RFID interrogator device 16 determines a spatial location of the resonant radiofrequency antenna elements 20(1)-20(3) in the radar image obtained in step 406. In one example, the resonant radiofrequency antenna elements 20(1)-20(3) have different resonant frequencies, polarization, or phase parameters to make them distinguishable from one another in the obtained radar image. FIG. 5 illustrates an exemplary processed radar image 48. The processed radar image 48 includes bright dots 50(1)-50(3) that correspond to the resonant radiofrequency antenna elements 20(1)-20(3), which can have different resonant frequencies, polarization or phase parameters to make them distinguishable.

In step 410, the RFID control computing device 30 of the RFID interrogator device 16 determines a pressure value for the fluid in the container in which the RFID tag 12 is located based on the spatial location of the resonant radiofrequency antenna elements 20(1)-20(3). Referring again to FIG. 5, the coordinates of bright dots 50(1)-50(3) corresponding to resonant radiofrequency antenna elements 20(1)-20(3) are recorded in processed image 48. In this example, the resonant radiofrequency antenna elements 20(1) and 20(3) are fixed on the RFID tag 14 to provide a frame of reference, while the resonant radiofrequency antenna element 20(2) is moveable on the deformable element 14 based on pressure exerted on the deformable element 14. The spatial location is used to measure the deformation of deformable element 14 based on pressure exerted on the deformable element 14. In one example, the movement of the deformable element 14 is correlated to changes in the pressure in the container in which the RFID tag 12 is located. The specific correlated values are dependent on the material used for the deformable element 14. In one example, the correlated values may be stored in a look-up table. In another example, the RFID control computing device 30 includes a pre-calibration based on the deformable element 14 employed that correlates the movement of the deformable element 14 to the value of pressure exerted on the deformable element 14 from the fluid in the environment in which the RFID tag 12, such as within a tire.

Referring again to FIG. 5, the distance A between resonant radiofrequency antenna element 20(2) and 20(3) is variable, while the distance B between resonant radiofrequency antenna element 20(1) and 20(3) remains constant. In some examples, the one-dimensional ratio A/B is sufficient to determine the pressure value if the orientation of the RFID tag 12 is known and the scan is performed along the RFID tag 12. In another example, a two-dimensional ratio using the Pythagorean theorem is calculated to determine corresponding pressure in the locality based on prior calibration of the deformable element 14. The method may then return to step 402 to obtain additional scans.

Accordingly, the RFID pressure measurement system 10 of the present technology advantageously provides an RFID pressure measurement system that can be used to measure pressure within a fluid-filled container, such as a tire, that employs entirely passive, low-cost, light weight RFID tags. The tags may advantageously be located within the container and require no maintenance which allows for an extended useful life. Further, the system allows for quick and easy measurement of pressure values.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for remotely measuring pressure of a fluid in a container implemented by one or more computing devices, the method comprising:
   determining a spatial location of first and second resonant radiofrequency antenna elements located on a radiofrequency identification (RFID) tag located in the container holding the fluid such that the RFID tag is immersed in the fluid, the first radiofrequency antenna element positioned in fixed position on the RFID tag and the second resonant radiofrequency antenna element positioned on a deformable element configured to be deformed in at least one dimension based on pressure from the fluid, from a radar image generated based on reflected radiofrequency beams from a scan area and re-radiated radiofrequency beams from the first and second resonant radiofrequency antenna elements located within the scan area resulting from the transmission of a radiofrequency beam to the scan area; and
   determining, based on the spatial location of the first and second resonant radiofrequency antenna elements, a pressure value for the fluid.

2. The method of claim 1, wherein determining the pressure value for the fluid further comprises:
   determining, based on the spatial location of the first and second resonant radiofrequency antenna elements, a change in position of the second resonant radiofrequency element with respect to the first resonant radiofrequency antenna element; and
   determining, based on the change in position of the second resonant radiofrequency antenna element, the pressure value for the fluid.

3. The method of claim 2, wherein the change in position of the second resonant radiofrequency antenna element is a based on a pre-calibration position of the second resonant radiofrequency antenna element with respect to the first resonant radiofrequency antenna element.

4. The method of claim 1, wherein the deformable element comprises a pressure-sensitive container having an elastic material filled with gas.

5. The method of claim 1, wherein the deformable element comprises a bourdon tube, a membrane, or a plurality of coils.

6. The method of claim 1, wherein the RFID tag further comprises at least a third resonant radiofrequency antenna element positioned on another fixed location on the RFID tag.

7. The method of claim 1, wherein the RFID tag is a passive RFID tag.

8. An RFID interrogator device, comprising memory comprising programmed instructions stored thereon and one or more processors configured to execute the stored programmed instructions to:
   determine a spatial location of first and second resonant radiofrequency antenna elements located on a radiofrequency identification (RFID) tag located in a container holding a fluid such that the RFID tag is immersed in the fluid, the first radiofrequency antenna element positioned in fixed position on the RFID tag and the second resonant radiofrequency antenna element positioned on a deformable element configured to be deformed in at least one dimension based on pressure from the fluid, from a radar image generated based on reflected radiofrequency beams from a scan area and re-radiated radiofrequency beams from the first and second resonant radiofrequency antenna elements located within the scan area resulting from the transmission of a radiofrequency beam to the scan area; and determine, based on the spatial location of the first and second resonant radiofrequency antenna elements, a pressure value for the fluid.

9. The device of claim 8, wherein the processors are further configured to:

determine, based on the spatial location of the first and second resonant radiofrequency antenna elements, a change in position of the second resonant radiofrequency element with respect to the first resonant radiofrequency antenna element; and determine, based on the change in position of the second resonant radiofrequency antenna element, the pressure value for the fluid.

10. The device of claim 9, wherein the change in position of the second resonant radiofrequency antenna element is a based on a pre-calibration position of the second resonant radiofrequency antenna element with respect to the first resonant radiofrequency antenna element.

11. The device of claim 8, wherein the deformable element comprises a pressure-sensitive container having an elastic material filled with gas.

12. The device of claim 8, wherein the deformable element comprises a bourdon tube, a membrane, or a plurality of coils.

13. The device of claim 8, wherein the RFID tag further comprises at least a third resonant radiofrequency antenna element positioned on another fixed location on the RFID tag.

14. The device of claim 8, wherein the RFID tag is a passive RFID tag.

15. A non-transitory computer readable medium having stored thereon instructions for remotely measuring pressure of a fluid in a container comprising executable code that, when executed by one or more processors, causes the processors to:

determine a spatial location of first and second resonant radiofrequency antenna elements located on a radiofrequency identification (RFID) tag located in the container such that the RFID tag is immersed in the fluid, the first radiofrequency antenna element positioned in fixed position on the RFID tag and the second resonant radiofrequency antenna element positioned on a deformable element configured to be deformed in at least one dimension based on pressure from the fluid, from a radar image generated based on reflected radiofrequency beams from a scan area and re-radiated radiofrequency beams from the first and second resonant radiofrequency antenna elements located within the scan area resulting from the transmission of a radiofrequency beam to the scan area; and determine, based on the spatial location of the first and second resonant radiofrequency antenna elements, a pressure value for the fluid.

16. The medium of claim 15, wherein the executable code, when executed by the processors further causes the processors to:

determine, based on the spatial location of the first and second resonant radiofrequency antenna elements, a change in position of the second resonant radiofrequency element with respect to the first resonant radiofrequency antenna element; and determine, based on the change in position of the second resonant radiofrequency antenna element, the pressure value for the fluid.

17. The medium of claim 16, wherein the change in position of the second resonant radiofrequency antenna element is a based on a pre-calibration position of the second resonant radiofrequency antenna element with respect to the first resonant radiofrequency antenna element.

18. The medium of claim 15, wherein the deformable element comprises a pressure-sensitive container having an elastic material filled with gas.

19. The medium of claim 15, wherein the deformable element comprises a bourdon tube, a membrane, or a plurality of coils.

20. The medium of claim 15, wherein the RFID tag further comprises at least a third resonant radiofrequency antenna element positioned on another fixed location on the RFID tag.

21. The medium of claim 15, wherein the RFID tag is a passive RFID tag.

* * * * *